United States Patent
Hariu et al.

[11] Patent Number: 6,070,949
[45] Date of Patent: Jun. 6, 2000

[54] BRAKING SYSTEM FOR A TWO-WHEELED MOTOR VEHICLE

[75] Inventors: Jun Hariu; Masayuki Fujita; Masahiro Yoshida; Norihisa Ishii, all of Saitama, Japan

[73] Assignee: Honda Giken Kogyo Kabushiki Kaisha, Tokyo, Japan

[21] Appl. No.: 09/033,484

[22] Filed: Mar. 3, 1998

[30] Foreign Application Priority Data

Mar. 3, 1997 [JP] Japan .................................. 9-047736

[51] Int. Cl.⁷ ........................................................ B62L 3/08
[52] U.S. Cl. ..................... 303/9.61; 188/344; 188/106 P; 188/349; 303/9.64; 303/DIG. 3
[58] Field of Search .................................. 303/9.61, 9.64, 303/13, 14, 7, 15, 115.2, 20, 9.75, 3, 6.01, 137, DIG. 3; 188/344, 349, 106 P, 345

[56] References Cited

U.S. PATENT DOCUMENTS

| | | |
|---|---|---|
| 3,350,142 | 10/1967 | Schuman . |
| 3,887,238 | 6/1975 | Bennett ........................................ 303/7 |
| 4,421,359 | 12/1983 | Hayashi et al. ......................... 303/9.61 |
| 4,428,620 | 1/1984 | Warwick et al. ................... 303/DIG. 3 |
| 4,598,954 | 7/1986 | Hayashi ................................... 303/9.61 |
| 4,674,804 | 6/1987 | Burgdorf et al. ........................... 303/15 |
| 4,950,028 | 8/1990 | Harrison . |
| 5,501,511 | 3/1996 | Wagner ................................... 303/9.61 |
| 5,544,946 | 8/1996 | Toyoda et al. .......................... 303/9.64 |
| 5,620,237 | 4/1997 | Iwashita et al. ....................... 303/9.64 |

FOREIGN PATENT DOCUMENTS 7-196068  1/1995  Japan .

*Primary Examiner*—Douglas C. Butler
*Attorney, Agent, or Firm*—Birch, Stewart, Kolasch & Birch, LLP

[57] ABSTRACT

Piping associated with interlocked brakes for front and rear wheel brakes is to be simplified to improve maintainability and provide a brake system suitable particularly for a two-wheeled motor vehicle satisfying racing specifications. A braking system includes hydraulic brakes with three hydraulic systems which are a lever hydraulic system for a front wheel brake, an interlocked hydraulic system for a rear wheel brake and a pedal hydraulic system. A pressure sensor detects a hydraulic pressure in the lever hydraulic system and outputs the detected signal to a control unit in the interlocked hydraulic system through an electric wire. The control unit controls the operation of a motor, thereby causing a hydraulic pressure to be developed in a submaster cylinder, which hydraulic pressure is fed to the rear wheel brake through a control valve. On the other hand, the pedal hydraulic system has a piping independent of that of the interlocked hydraulic system and supplies a hydraulic pressure generated in a master cylinder for the rear wheel brake by operation of a brake pedal to the rear wheel brake through a route separate from the interlocked hydraulic system.

14 Claims, 7 Drawing Sheets

——— IDEAL CURVE
—·—·— IN A LARGE INNER DIAMETER DIFFERENCE
------ IN A SMALL INNER DIAMETER DIFFERENCE

BRAKING SYSTEM FOR A TWO-WHEELED MOTOR VEHICLE

BACKGROUND OF THE INVENTION

1. Field of the Invention

The present invention relates to a braking system suitable for a two-wheeled motor vehicle having front and rear wheel brakes, particularly a two-wheeled motor vehicle which satisfies racing specifications.

2. Description of Background Art

In Japanese Patent Laid Open No. 196068/95 a braking system for a two-weeled motor vehicle is disclosed wherein hydraulic brakes are disposed respectively for front and rear wheels. A lever hydraulic system for the supply of a hydraulic pressure by operation of a lever is connected to the front wheel brake, while to the rear wheel brake is connected an interlocked hydraulic system provided with a submaster cylinder which produces a hydraulic pressure in interlock with said operation of the lever. A pedal hydraulic system is also connected for the supply of a hydraulic pressure by operation of a pedal.

The submaster cylinder in the above interlocked hydraulic system produces a hydraulic pressure responsive to a change in hydraulic pressure detected by a hydraulic pressure sensor provided in the lever hydraulic system and is supplied with a hydraulic pressure also from the pedal hydraulic system, while the pedal hydraulic system supplies a hydraulic pressure directly to the rear wheel brake and also to the submaster cylinder.

In the above conventional braking system, since the pedal hydraulic system is branched and piped to both the rear brake and submaster cylinders in the interlocked hydraulic system, the number of steps in the piping work and the weight are increased. In addition, a limitation is placed on the piping layout.

Besides, even for the maintenance of either the pedal hydraulic system or the interlocked hydraulic system, the piping must be cut at the joint portion of the two. Maintenance of only one system does not suffice and hence it is impossible to effect a quick unit change for each system. Thus, there is still room for improvement with regard to the maintenance. The request for this improvement has been strong particularly in two-wheeled motor vehicles meeting racing specifications for which a very short time for maintenance is important.

Further, the hydraulic pressure from the pedal hydraulic system is supplied not only directly to the rear wheel brake but also to the submaster cylinder, so in the case of generating a hydraulic pressure also in the interlocked hydraulic system by using the front and rear wheel brakes at a time, there sometimes occurs the case where the hydraulic pressure supplied directly from the pedal hydraulic system and the hydraulic pressure supplied from the interlocked hydraulic system interfere with each other. For avoiding this inconvenience, both structure and control are markedly complicated.

SUMMARY AND OBJECTS OF THE INVENTION

According to the present invention, in order to solve the above-mentioned problems, there is provided a braking system for a two-wheeled motor vehicle wherein hydraulic brakes are disposed respectively for front and rear wheels. A lever hydraulic system for the supply of a hydraulic pressure by operation of a lever is connected to the front wheel brake, while the rear wheel brake is connected to an interlocked hydraulic system provided with a submaster cylinder which produces a hydraulic pressure in interlock with the operation of the lever. In addition, a pedal hydraulic system is connected for the supply of a hydraulic pressure by operation of a pedal. The interlocked hydraulic system and the pedal hydraulic system each supply a hydraulic pressure independently to the rear wheel brake.

In this braking system, a fluid passage to the rear wheel brake and a fluid passage to a reservoir tank may be formed in the submaster cylinder.

Moreover, out of the fluid passages formed in the submaster cylinder, the fluid passage leading to the rear wheel may be made larger in inner diameter than the fluid passage leading to the reservoir tank.

Further, there may be adopted a construction, in combination with the above construction, wherein the two-wheeled motor vehicle is provided with a seat, a portion of a vehicle body frame which supports the seat, and a rear seat cowl disposed below the seat in a surrounding relation to the portion of the vehicle body frame, and the submaster cylinder, as well as a control unit and a control valve, which constitute the interlocked hydraulic system, are disposed within the rear seat cowl while being supported by the said portion of the vehicle body frame.

Since the interlocked hydraulic system and the pedal hydraulic system supply a liquid pressure each independently to the rear wheel brake, both systems can be piped each independently to the rear wheel brake. Consequently, it is possible to decrease the number of steps in the piping work, reduce the weight, and enhance the freedom of the piping layout.

Besides, for the maintenance of either the pedal hydraulic system or the interlocked hydraulic system, it is possible to effect maintenance of only one system and hence it becomes possible to perform a quick unit change for each system, whereby the maintainability is improved remarkably, and the braking system becomes suitable particularly for a two-wheeled motor vehicle satisfying racing specifications.

Moreover, even when the front and rear wheel brakes are used simultaneously and the interlocked hydraulic system also generates a hydraulic pressure at the same time, the hydraulic pressure from the pedal hydraulic system and that from the interlocked hydraulic system are each fed independently to the rear wheel brake, so that interference does not occur between both hydraulic pressures, that is, a marked complicatedness in structure and control for preventing the occurrence of such interference can be avoided. Consequently, it is possible to simplify the structure and control of the braking system.

Further, if a fluid passage to the rear wheel brake and a fluid passage to a reservoir tank are formed in the submaster cylinder, the reservoir tank can be connected directly to the submaster cylinder, whereby a desired operation by the submaster cylinder alone can be made possible, with the result that the assembling work for the braking system and maintenance thereof becomes easier.

Further, if out of the fluid passages formed in the submaster cylinder the fluid passage leading to the rear wheel is made larger in inner diameter than the fluid passage leading to the reservoir tank, the rear wheel braking force for example can be controlled by the difference in inner diameter between both fluid passages, thus permitting a reduction in the number of components used.

Additionally, if the submaster cylinder, as well as a control unit and a control valve, which constitute the interlocked hydraulic system, are disposed within a rear seat cowl while being supported by a portion of the vehicle body frame, not only are they difficult to see from the exterior but also maintainability is improved because the whole of the interlocked hydraulic system can be easily replaced as a unit at the time of maintenance. Also in this point the braking system of the present invention is advantageous particularly to a two-wheeled motor vehicle for racing.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The embodiment of the present invention applied to a two-wheeled motor vehicle for road racing will be described hereinunder with reference to the drawings.

Figure 1:
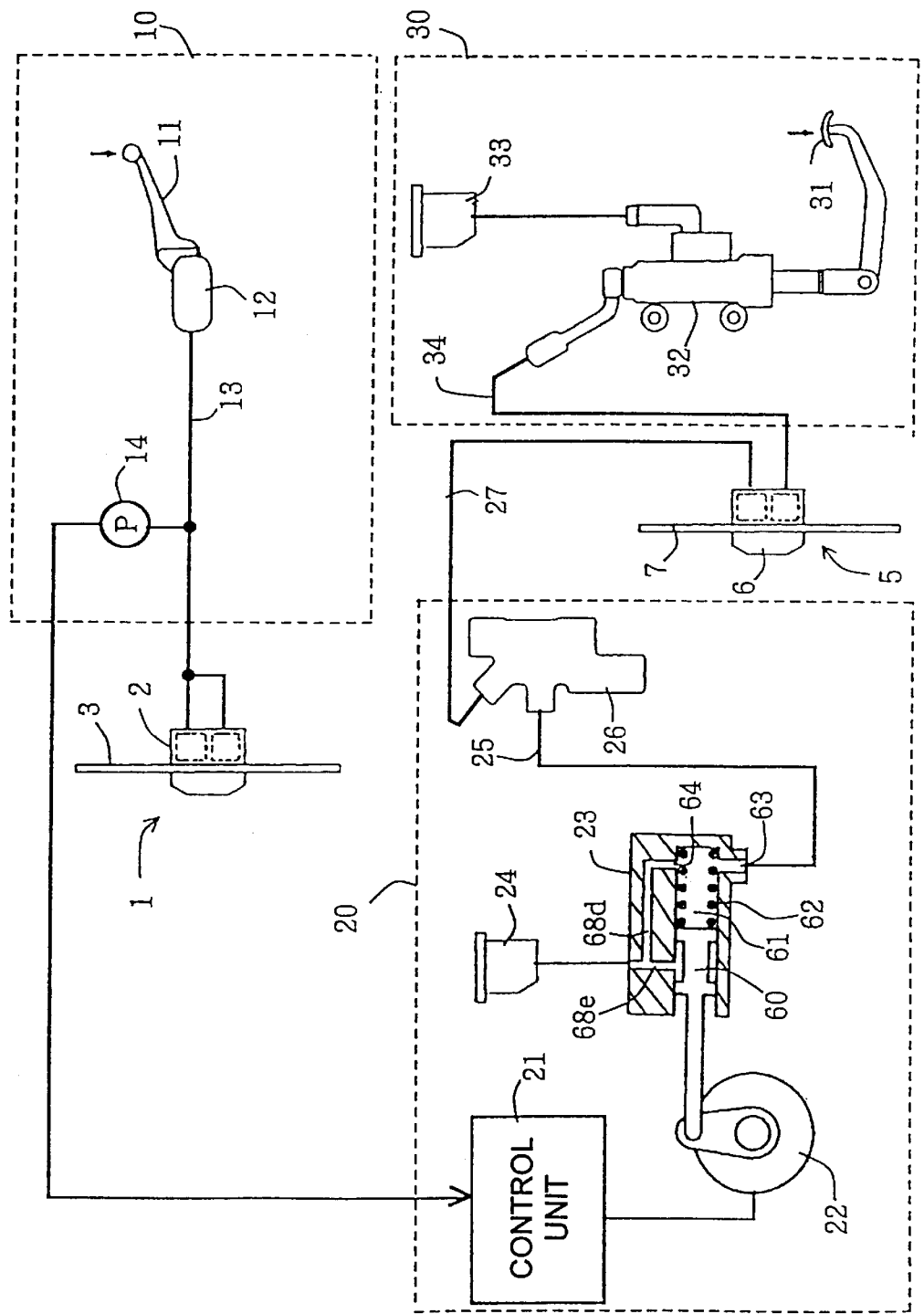
FIG. 1 is a schematic diagram of front and rear wheel brakes in a two-wheeled motor vehicle to which the present invention is applied.

As shown in FIG. 1, the braking system used in this two-wheeled motor vehicle comprises three systems which are a lever hydraulic system 10 for a front wheel brake 1, an interlocked liquid pressure system 20 for a rear wheel brake 5 and a pedal hydraulic system 30.

First, in the lever hydraulic system 10, a hydraulic pressure generated in a master cylinder 12 for the front wheel by a brake lever 11 is fed through a hose 13 to a brake caliper 2 of the front wheel brake 1, thereby actuating a brake disc 3. At the same time, the hydraulic pressure is detected by a pressure sensor 14.

The interlocked hydraulic system 20 is provided with a control unit 21 to which is inputted a pressure signal detected by the pressure sensor 14, a motor 22 whose operation is controlled by the control unit 21, a submaster cylinder which generates a hydraulic pressure, and a control valve 26.

The control unit 21 is for driving the motor 22 for a certain period of time only when the value detected by the pressure sensor 14 exceeds a predetermined reference value. It can be constituted by a suitable member such as, for example, a relay circuit, a logical circuit, or a microcomputer. The contents of the control will be described later in detail.

The motor 22 is adapted to operate only for a certain time to generate a hydraulic pressure in the submaster cylinder 23 and return to the initial value upon lapse of a predetermined time thereafter. The details of this point will be described later.

The submaster cylinder 23 is in communication with a reservoir tank 24 and supplies the hydraulic pressure generated by the motor 22 to the control valve 26 through a hose 25. The control valve 26 blocks the output of hydraulic pressure from the submaster cylinder 23 only in a predetermined certain condition for balancing between the front and rear wheel brakes, while in other cases it allows the hydraulic pressure to be fed as it is to a brake caliper 6 of the rear wheel brake 5 through a hose 27. Thus, the control valve 26 is a known control valve.

Once the hydraulic pressure is fed to the brake caliper 6 of the rear wheel brake 5 from the control valve 26, a brake disc 7 can be actuated interlockedly with the front wheel brake 1 by means of the brake caliper 6 in a balanced state between the front and rear wheel brakes 1, 5.

The pedal hydraulic system 30 comprises a master cylinder 32 for the rear wheel brake which generates a hydraulic pressure by operation of a brake pedal 31. A reservoir tank 33 is connected to the master cylinder 32. A hose 34 is provided for supplying the hydraulic pressure in the master cylinder 32 to another port of the brake caliper 6.

Figure 2:
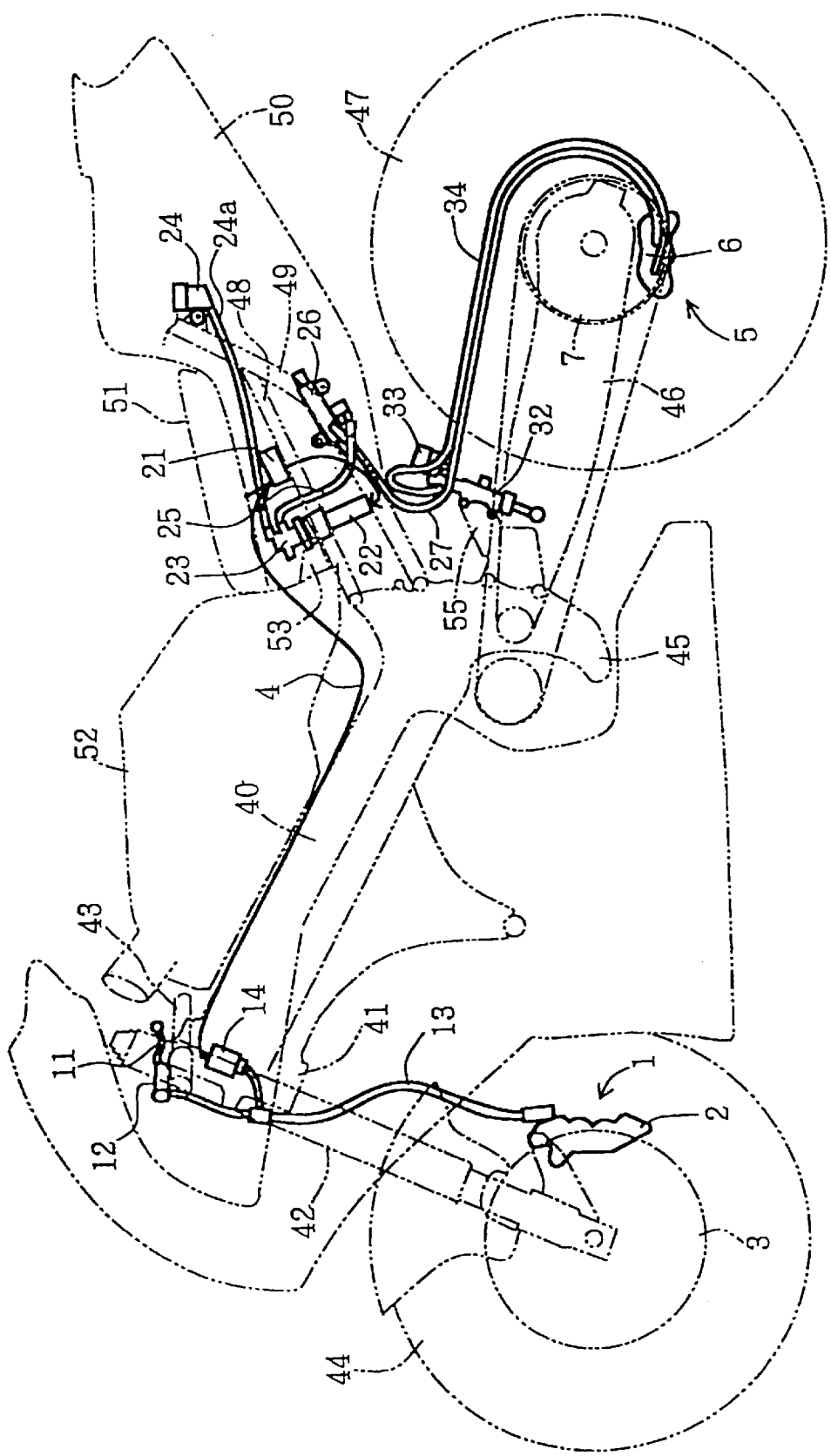
FIG. 2 is a layout diagram of brake components for the body of the two-wheeled motor vehicle.
Figure 3:
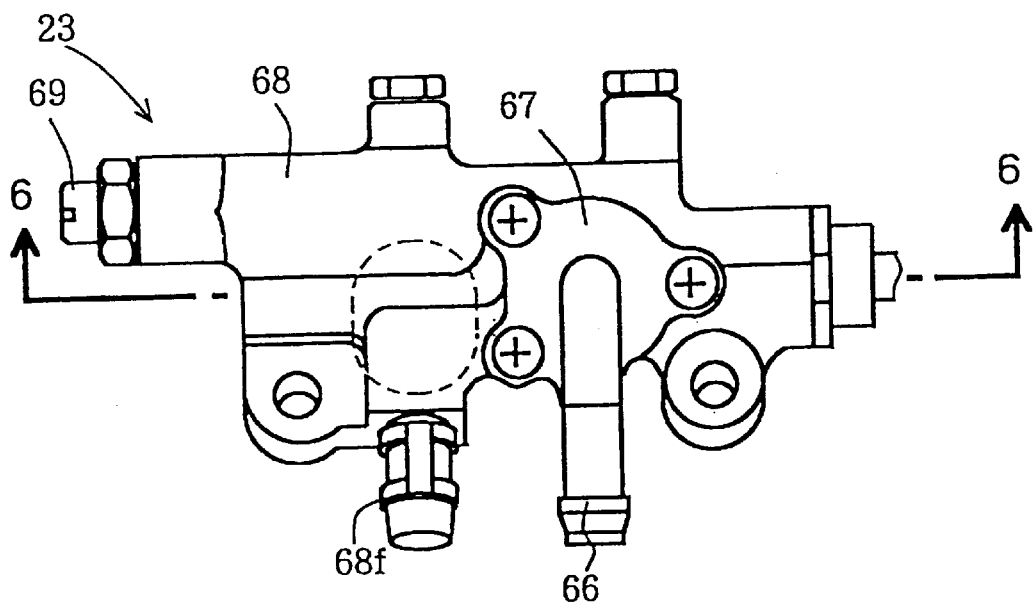
FIG. 3 is a diagram showing an appearance of a submaster cylinder.
Figure 4:
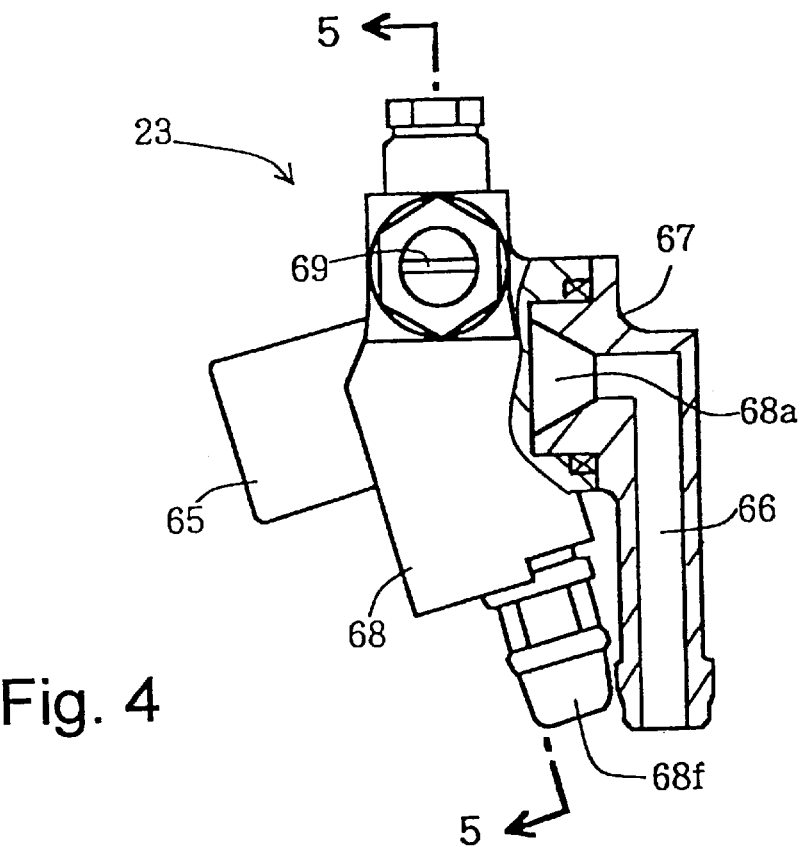
FIG. 4 is a left side view thereof.
Figure 5:
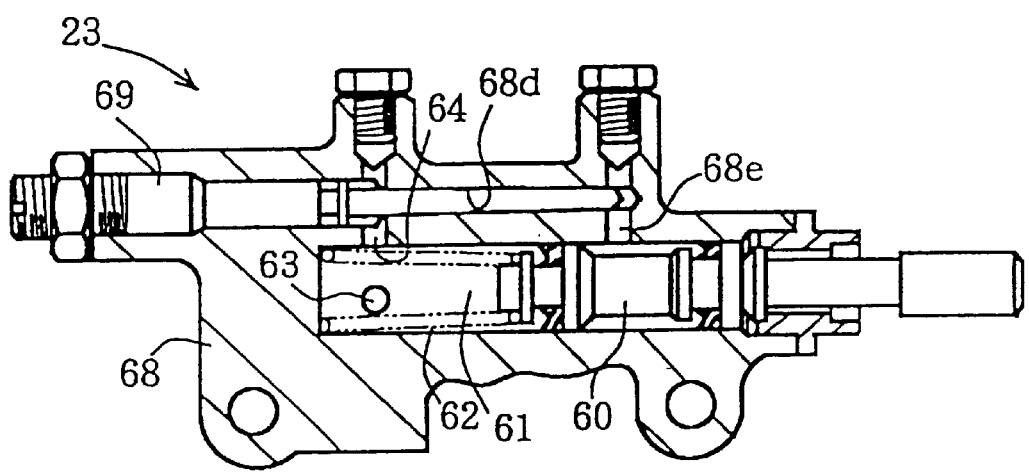
FIG. 5 is a sectional view taken along line 5—5 in FIG. 4.

The following description is now provided concerning the layout of the components of the above hydraulic pressure systems which are arranged in the vehicle body. In FIG. 2, a pair of right and left main frames extends in the longitudinal direction, and upper portions of front forks 42 are supported by the front ends of the main frames 40 pivotably through a head pipe 41.

The front forks 42 are provided in a pair right and left and can be steered with a handle 43 mounted on the upper end portions of the front forks. A front wheel 44 is supported by the lower ends of the front forks 42.

The rear end portions of the main frames 40 are connected to a pair of right and left pivot frames 45 extending in the vertical direction. Rear swing arms 46 are swingably supported at the front ends thereof by the pivot frames 45, and a rear wheel 47 is supported by the rear end portions of the rear swing arms 46.

A pair of right and left seat rails 48 and a pair of right and left rear stays 49, which are constituent portions of the vehicle body frame, extend obliquely upwardly and rearwardly and support a rear cowl 50 which covers them.

A seat 51 is supported on the rear cowl 50, and a bracket 53 is formed at the rear end portion of a fuel tank 52 which is mounted on the main frames 40 in front of the seat 51, the bracket 53 is fixed removably onto the seat rails 48.

The brake lever 11, the master cylinder 12 for the front wheel and the pressure sensor 14, which constitute the lever hydraulic system 10, are each supported in the vicinity of the head pipe 41, and through an electric wire 4 extending rearwardly substantially along a side face of a main frame 40, the output of the pressure sensor 14 is connected to the control unit 21 which is supported by the seat rails 48.

The submaster cylinder 23, the control unit 21 and the control valve 26, which constitute the interlocked hydraulic system 20, are each supported by the seat rails 48. The motor 22 is mounted to the bracket 53 of the fuel tank 52, and the reservoir tank 24 is supported at the rear end portions of the rear stays 49. These components are arranged within the rear seat cowl 50.

A hose 24a connected to the reservoir tank 24 and the hose 25 connected to the control valve 26 are both connected to the submaster cylinder 23 within the rear seat cowl 50.

The hose 27 extends from the control valve 26 downwardly to the exterior of the rear seat cowl 50 and is connected to the brake caliper 6 of the rear wheel brake 5. The hose 27 is curved halfway and passes the vicinity of the master cylinder 32 for the rear wheel brake which is positioned below the submaster cylinder 23.

The master cylinder 32 for the rear wheel brake as a constituent of the pedal hydraulic system 30 is supported by the rear portion of a pivot frame 45 through a stay 55. From the position of the master cylinder 32 the hose 34 extends toward the brake caliper 6 of the rear wheel brake 5. The hose 34 is laid so as to extend rearwardly above the rear swing arms 46 together with and substantially in parallel with the hose 27.

A detailed structure of the submaster cylinder 23 will now be described with reference to FIGS. 3 to 7. A piston 60 is provided in the submaster cylinder 23 which is moved by the motor 22, a fluid chamber 61 into which the piston 60 is inserted on an inlet side and moves back and forth, a return spring 62 for returning the piston 60 to its initial position, a first port 63 and a second port 64.

Figure 6:
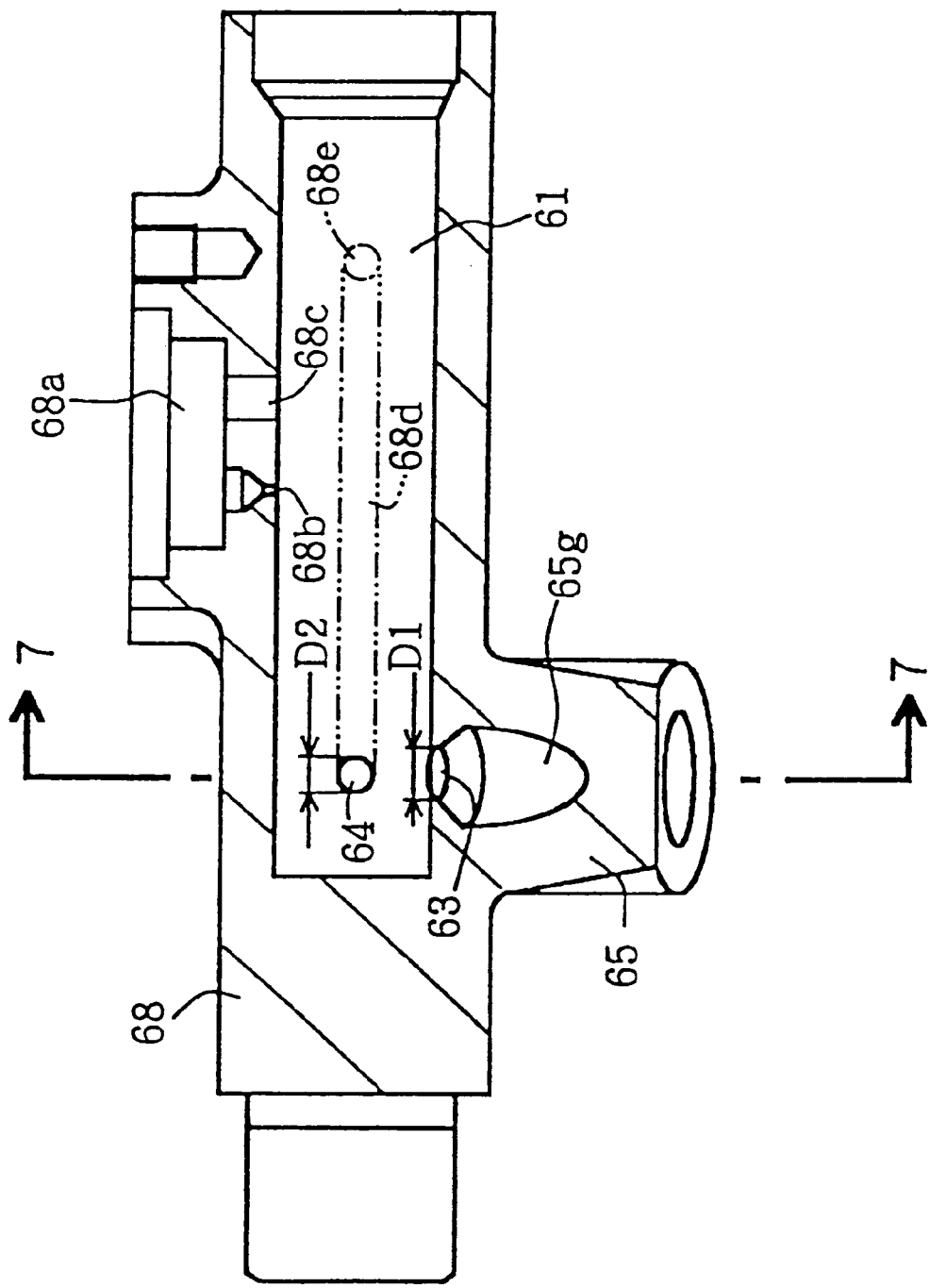
FIG. 6 is a sectional view of a body portion of the submaster cylinder taken along line 6—6 in FIG. 3.
Figure 7:
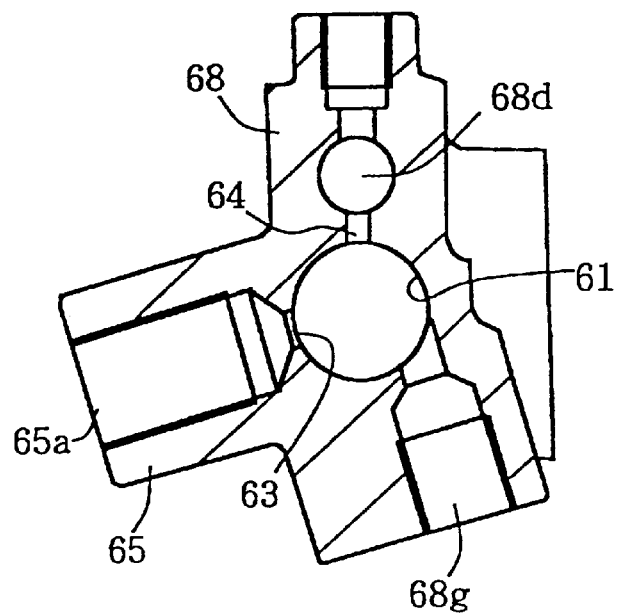
FIG. 7 is a sectional view of the body portion of the submaster cylinder taken along line 7—7 in FIG. 6.

The first and second ports 63, 64 are formed at positions almost equal in distance from the inlet side of the liquid chamber 61 and at different angles. The first port 63 has an inner diameter of D1 and is in communication with a joint passage 65a formed in a joint 65 to which the hose 25 is connected, while the second port 64 has an inner diameter of D2 and is in communication with a joint 66 leading to the reservoir tank 24, provided D1 and D2 are in the relation of D1>D2 (FIG. 6).

The joint 66 is provided in a cover 67. The cover 67 is applied above a recess 68a formed in a side face of body portion 68 of the submaster cylinder, with holes 68b and 68c being formed in the recess 68a.

On the other hand, the second port 64 is a lateral hole extending in a direction perpendicular to the axial direction of the liquid chamber 61. A longitudinal hole 68d is formed axially in a thick wall portion of the body 68 in communication with the second port 64. The longitudinal hole 68d is in communication with a lateral hole 68e which extends in a direction perpendicular to the axial direction of the fluid chamber 61 so as to become open into the liquid chamber at an advanced position of the piston 60. A reservoir passage is formed by the second port 64, longitudinal hole 68d and lateral hole 68e.

A breather cap 68f is provided together with a breather passage 68g, and a rise adjusting valve 69, which is adapted to move axially back and forth through the longitudinal hole 68d to adjust the amount of fluid returned to the reservoir tank 24.

Figure 8:
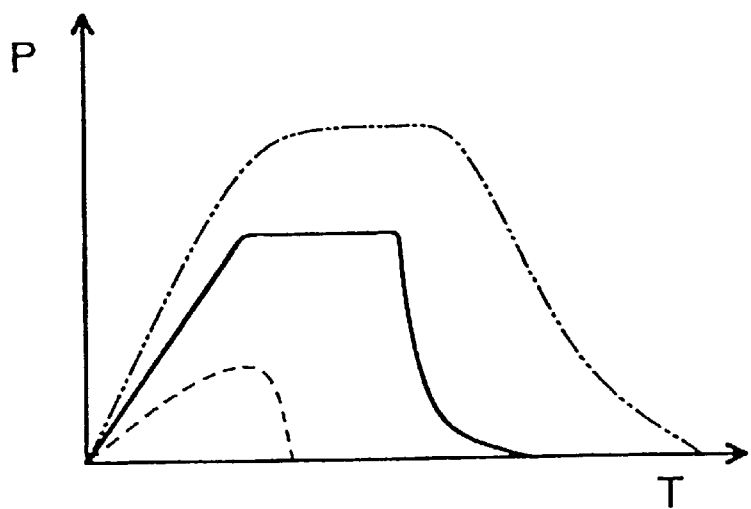
FIG. 8 is a graph showing changes in hydraulic pressure of the rear wheel brake unit.

FIG. 8 is a graph concerned with setting the inner diameter of the first port 63 and that of the second port 64. In the same figure, the solid line is an ideal curve in a hydraulic pressure control made by the control valve 26. According to this ideal curve, when the hydraulic pressure fed from the submaster cylinder 23 exceeds a predetermined value, it is cut by the control valve 26, and upon subsequent lapse of a predetermined time there occurs a sudden fall. The hydraulic pressure, P. fed from the submaster cylinder 23 is plotted along the axis of the ordinate, while the time elapsed, T, is plotted along the axis of the abscissa.

By adjusting the difference between the inner diameters D1 and D2 of the first and second ports 63, 64 it is made possible to set the curve of the hydraulic pressure developed in the submaster cylinder 23 so as to approximate the above ideal curve. However, a difference which is too large between the inner diameters D1 and D2 is not appropriate because a high hydraulic pressure like the notional line in the same figure is generated and a load is thereby imposed on the motor 22. A difference which is too small, similar to the broken line in FIG. 8, is not appropriate either because it becomes impossible to supply a sufficient hydraulic pressure.

Figure 9:
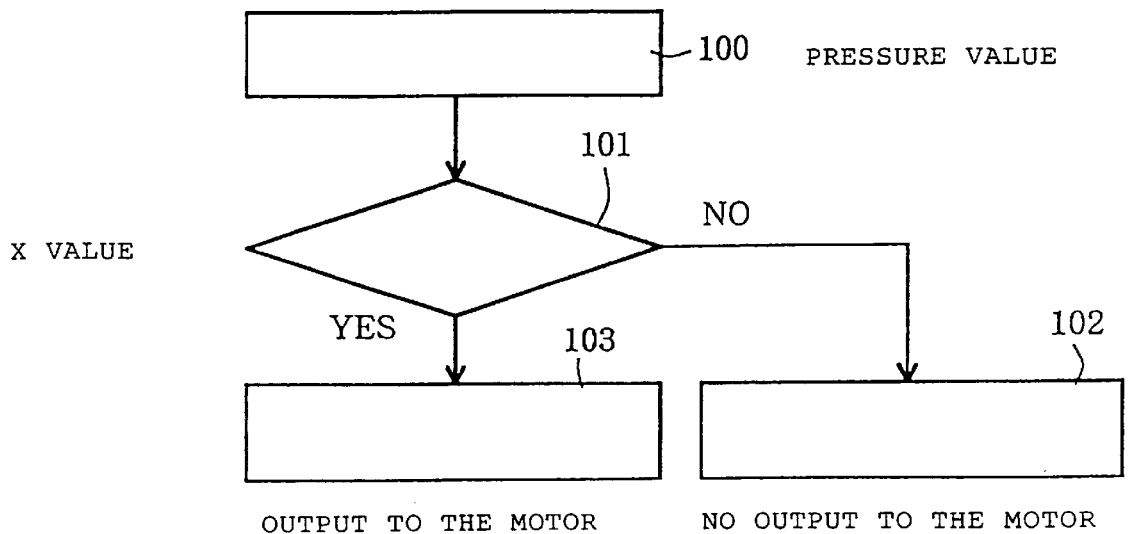
FIG. 9 is a flow chart of the control made by a control.

With reference to FIG. 9, the following description is now provided about in what manner the submaster cylinder 23 is controlled by the control unit 21. First, when a hydraulic pressure is developed in the lever hydraulic system 10 by operation of the brake lever 11, it is detected by the pressure sensor 14, which in turn outputs a hydraulic pressure signal to the control unit 21 through the electric wire 4. The control unit 21 sets a detection pressure value A in accordance with the signal thus inputted therein (100).

The detection pressure value A is compared with a reference value X (101) and if X>A, the motor 22 is not driven (102). In this case, the front and rear wheels are braked each independently by the lever hydraulic system 10 alone or by both lever hydraulic system 10 and pedal hydraulic system 30.

On the other hand, if X is greater than or equal to A, since this conforms to the driving condition of the motor 22, the motor is driven (103). The motor 22 is driven for only a certain time to supply the hydraulic pressure generated in the submaster cylinder 23 to the control valve 26 through both hose 25 and control valve 26 and further to the brake caliper 6 through the hose 27.

Figure 10:
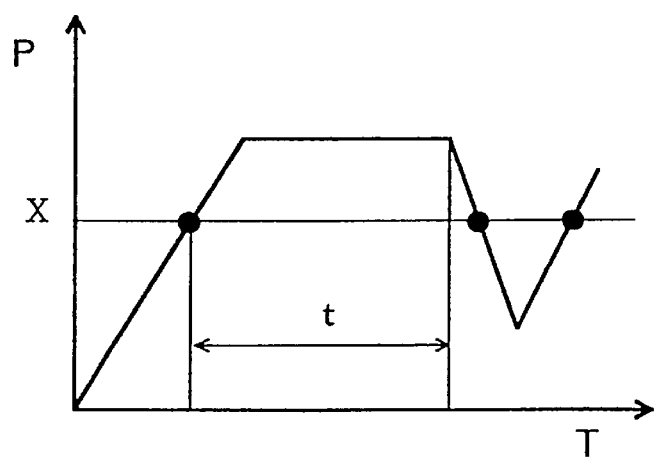
FIG. 10 is a graph showing changes in hydraulic pressure of the front wheel brake and the operation of the submaster cylinder.

Now, with reference to FIG. 10, a description will be given concerning a method for driving the motor 22. When the value detected by the pressure sensor 14 is not less than the reference value X, the motor 22 is driven by the control unit 21. Upon lapse of a predetermined time, t, the motor 22 turns OFF automatically and returns to its initial position. Thereafter, when the detected value again becomes equal to or larger than the reference value X, the above operations are repeated. In FIG. 8, the axis of the ordinate represents the hydraulic pressure P created in the lever hydraulic system 10, while the axis of the abscissa represents the time elapsed, T.

In this embodiment, the means for returning the motor 22 to its initial position corresponds to the return spring 62. The motor 22 can also be returned to its original position by polarity conversion for reverse rotation thereof with use of a relay for example.

The operation of this embodiment will now be described. In FIG. 1, the lever hydraulic system 10 for the front wheel brake 1 is separated, not connected through fluid passages, from the interlocked hydraulic system 20 and the pedal hydraulic system 30 for the rear wheel brake 5, with a connection being made between the pressure sensor 14 and the control unit 21 merely by the electric wire 4.

Thus, it is possible to omit piping between the front and rear wheel brakes, resulting in that the entire piping length becomes smaller.

As to the relation of interlocking between the lever hydraulic system 10 and the interlocked hydraulic system 20, the pressure sensor 14 and the control unit 21 are not only interconnected through the electric wire 4 but also a stroke quantity of the brake lever 11 may be detected electrically or mechanically and the detected output may be connected to the interlocked hydraulic system 20 side through an electric wire or cable.

Also as to the interlocked hydraulic system 20 and the pedal hydraulic system 30, separate piping systems are used so that both systems can each be mounted and removed independently.

Therefore, when any one of the hydraulic systems 10, 20 and 30 is to be removed for maintenance, that system alone can be removed or replaced, so that both maintainability and economy are improved.

Particularly, as to the interlocked hydraulic system 20 and the pedal hydraulic system 30, when one of the two is to be removed for maintenance, it is not necessary to perform a pipe cutting operation between its piping and the piping of the other system. Thus, maintainability is superior also in this point.

Besides, since the control unit 21, submaster cylinder 23, motor 22 and control valve 26, which constitute the interlocked hydraulic system 20, are all supported by either the seat rails 48 or the rear stay 49 and are disposed within the rear cowl 50, a particularly outstanding effect can be attained when the braking system of this embodiment is applied to a two-wheeled motor vehicle satisfying racing specifications for which a short time replacement or maintenance is required. Additionally, the braking system in question can be disposed on the vehicle body without impairing the appearance of the vehicle.

Moreover, by making the hydraulic system on the front wheel brake side and that on the rear wheel brake side separate from each other, it is possible to operate the rear wheel brake independently of the front wheel brake and hence it becomes easy to perform a posture control by the operation of the rear wheel brake.

Further, even when the front and rear wheel brakes are used at a time and the interlocked hydraulic system 20 generates a hydraulic pressure at the same time, since the hydraulic pressure from the pedal hydraulic system 30 and that from the interlocked hydraulic system 20 are fed each independently to the rear wheel brake 5, interference does not occur between both hydraulic pressures. In other words, a marked complicatedness in both structure and control for preventing such interference can be avoided and therefore it is possible to simplify the structure and control of the braking system.

Further, if the first port as a fluid passage to the rear wheel brake 5 and the reservoir passage defined by the second port 64 as a fluid passage to the reservoir tank 24 and longitudinal and lateral holes 68d, 68e are formed in the submaster cylinder 23, the reservoir tank 24 can be connected directly to the submaster cylinder 23, whereby the de-airing operation by the submaster cylinder 23 alone becomes feasible, so that it becomes easy to effect the assembling work and maintenance of the braking system.

Further, out of the inner diameters of the first and second ports 63, 64 both formed in the submaster cylinder 23, if the inner diameter D1 of the first port 63 which constitutes a fluid passage to the rear wheel brake 5 is set larger than the inner diameter D2 of the second port 64 which constitutes a fluid passage to the reservoir tank 24, the braking force for the rear wheel can be controlled by the difference in the inner diameter between the fluid passages formed in the submaster cylinder 23, so that the number of components can be decreased.

Further, if the submaster cylinder 23, control unit 21 and control valve 26, which constitute the interlocked hydraulic system 20, are supported by the seat rails 48 and disposed within the rear seat cowl 50, not only they are difficult to be seen from the exterior but also for maintenance the whole of the interlocked hydraulic system can be replaced easily as a unit, resulting in that the maintainability is improved. Also in this point the braking system of this embodiment is useful as an interlocked brake for racing.

Additionally, since the operation of the motor 22 is set so as to return to the initial position after the lapse of a certain time, it is possible to lighten the burden on the motor.

The invention being thus described, it will be obvious that the same may be varied as a departure from the spirit and scope of the invention, and all such modifications as would be obvious to one skilled in the art are intended to be included within the scope of the following claims.

What is claimed is:

1. In a braking system for a two-wheeled motor vehicle including a vehicle body frame with a seat operatively supported on a portion of a vehicle body frame wherein hydraulic brakes are disposed respectively for front and rear wheels, the rear wheel being mounted on a swing arm, a lever hydraulic system for a supply of hydraulic pressure by operation of a lever is connected to the front wheel brake, while an interlocked hydraulic system provided with a submaster cylinder which produces hydraulic pressure through a first conduit in interlock with said operation of the lever is supplied to the rear wheel brake and a pedal hydraulic system, including a master cylinder, for the supply of hydraulic pressure through a second conduit by operation of a pedal is also connected to the rear wheel brake, the improvement characterized in that:

a rear cowl is disposed below the seat in a surrounding relation to the portion of the vehicle body frame and the submaster cylinder, as well as a control unit and a control valve, for constituting said interlocked hydraulic system, are disposed within the rear seat cowl and are supported by the portion of the vehicle body frame;

said first conduit is curved halfway and passes the vicinity of the master cylinder for the rear wheel brake, said master cylinder being positioned beneath said submaster cylinder;

said second conduit extending rearwardly above the swing arm of the rear wheel and being disposed substantially in parallel with the first conduit; and said interlocked hydraulic system and said pedal hydraulic system supply hydraulic pressure each independently to the rear wheel brake.

2. The braking system for a two-wheeled motor vehicle according to claim 1, wherein a fluid passage operatively connected to said first conduit to the rear wheel brake and a fluid passage to a reservoir tank are formed in said submaster cylinder.

3. The braking system for a two-wheeled motor vehicle according to claim 2, wherein out of the fluid passages formed in said submaster cylinder, the fluid passage leading to the rear wheel is larger in inside diameter than the fluid passage leading to the reservoir tank.

4. The braking system for a two-wheeled motor vehicle according to claim 1, wherein the interlocked hydraulic system includes the submaster cylinder, the control unit and the control valve to regulate the supply of hydraulic pressure from the interlocked hydraulic system to the rear wheel brake.

5. The braking system for a two-wheeled motor vehicle according to claim 1, wherein the submaster cylinder includes a piston reciprocably mounted therein, said piston being operatively connected to a motor for imparting reciprocation thereto, said motor being selectively operated by a control unit being responsive to a signal generated by operation of the lever connected to the front wheel brake.

6. The braking system for a two-wheeled motor vehicle according to claim 5, wherein the submaster cylinder includes a first port in communication with the rear wheel brake and a second port in communication with a reservoir, said piston being operatively mounted for reciprocation in a chamber formed between said first port and said second port, an inner diameter of said first port is larger relative to an inner diameter of the second port.

7. The braking system for a two-wheeled motor vehicle according to claim 5, wherein said motor is actuated for a predetermined period of time when a reference signal from the lever connected to the front wheel brake is greater than or equal to a predetermined reference value inputted into said control unit.

8. In a braking system for a two-wheeled motor vehicle including a vehicle body frame with a seat operatively supported on a portion of a vehicle body frame wherein a lever hydraulic system for the supply of a hydraulic pressure by operation of a lever is connected to the front wheel brake, while an interlocked hydraulic system provided with a submaster cylinder which produces hydraulic pressure through a first conduit in interlock with said operation of the lever is supplied to the rear wheel brake and a pedal hydraulic system, including a master cylinder, for the supply of hydraulic pressure through a second conduit by operation of a pedal is also connected to the rear wheel brake, the rear wheel being mounted on a swing arm, the improvement characterized in that:
 a rear cowl is disposed below the seat in a surrounding relation to the portion of the vehicle body frame and the submaster cylinder, as well as a control unit and a control valve, for constituting said interlocked hydraulic system, are disposed within the rear seat cowl and are supported by the portion of the vehicle body frame;
 said first conduit is curved halfway and passes the vicinity of the master cylinder for the rear wheel brake, said master cylinder being positioned beneath said submaster cylinder;
 said second conduit extending rearwardly above the swing arm of the rear wheel and being disposed substantially in parallel with the first conduit; and
 actuation of said lever for applying a hydraulic pressure to said front wheel brake selectively actuates said interlocked hydraulic system for independently supplying a hydraulic braking pressure to said rear wheel brake independently from a hydraulic pressure supplied by said pedal hydraulic system to the rear wheel brake.

9. The braking system for a two-wheeled motor vehicle according to claim 8, wherein a fluid passage operatively connected to said first conduit to the rear wheel brake and a fluid passage to a reservoir tank are formed in said submaster cylinder.

10. The braking system for a two-wheeled motor vehicle according to claim 9, wherein with respect to the fluid passages formed in said submaster cylinder, the fluid passage leading to the rear wheel is larger in inside diameter than the fluid passage leading to the reservoir tank.

11. The braking system for a two-wheeled motor vehicle according to claim 8, wherein the interlocked hydraulic system includes the submaster cylinder, the control unit and the control valve to regulate the supply of hydraulic pressure from the interlocked hydraulic system to the rear wheel brake.

12. The braking system for a two-wheeled motor vehicle according to claim 8, wherein the submaster cylinder includes a piston reciprocably mounted therein, said piston being operatively connected to a motor for imparting reciprocation thereto, said motor being selectively operated by a control unit being responsive to a signal generated by operation of the lever connected to the front wheel brake.

13. The braking system for a two-wheeled motor vehicle according to claim 12, wherein the submaster cylinder includes a first port in communication with the rear wheel brake and a second port in communication with a reservoir, said piston being operatively mounted for reciprocation in a chamber formed between said first port and said second port, an inner diameter of said first port is larger relative to an inner diameter of the second port.

14. The braking system for a two-wheeled motor vehicle according to claim 12, wherein said motor is actuated for a predetermined period of time when a reference signal from the lever connected to the front wheel brake is greater than or equal to a predetermined reference value inputted into said control unit.

* * * * *